(12) United States Patent
Shah

(10) Patent No.: US 9,354,899 B2
(45) Date of Patent: May 31, 2016

(54) SIMULTANEOUS DISPLAY OF MULTIPLE APPLICATIONS USING PANELS

(75) Inventor: Roma Shah, San Francisco, CA (US)

(73) Assignee: Google Inc., Mountain View, CA (US)

( * ) Notice: Subject to any disclaimer, the term of this patent is extended or adjusted under 35 U.S.C. 154(b) by 647 days.

(21) Appl. No.: 13/088,790

(22) Filed: Apr. 18, 2011

(65) Prior Publication Data

US 2012/0266089 A1  Oct. 18, 2012

(51) Int. Cl.
*G06F 3/0354* (2013.01)
*G06F 3/0481* (2013.01)
*G06F 3/0488* (2013.01)
*G06F 9/44* (2006.01)

(52) U.S. Cl.
CPC .......... *G06F 9/4443* (2013.01); *G06F 3/03545* (2013.01); *G06F 3/03547* (2013.01); *G06F 3/0481* (2013.01); *G06F 3/04883* (2013.01)

(58) Field of Classification Search
CPC .............. G06F 3/04883; G06F 3/0481; G06F 3/03545; G06F 3/03547
USPC .......... 707/769, E17.014; 715/760, 764–769, 715/781–807, 810, 864; 709/203; 345/173–179, 629
See application file for complete search history.

(56) References Cited

U.S. PATENT DOCUMENTS

| | | | |
|---|---|---|---|
| 5,568,604 A * | 10/1996 | Hansen | 715/863 |
| 6,072,486 A * | 6/2000 | Sheldon et al. | 715/835 |
| 6,571,245 B2 | 5/2003 | Huang et al. | |
| 6,664,983 B2 * | 12/2003 | Ludolph | 715/775 |
| 6,765,592 B1 | 7/2004 | Pletcher et al. | |
| 7,818,677 B2 | 10/2010 | Ruthfield et al. | |
| 7,880,728 B2 * | 2/2011 | de los Reyes et al. | 345/173 |
| 7,886,290 B2 * | 2/2011 | Dhanjal et al. | 717/170 |
| 7,954,068 B2 * | 5/2011 | Riggs et al. | 715/838 |
| 8,032,843 B2 * | 10/2011 | Ording et al. | 715/862 |
| 8,291,348 B2 * | 10/2012 | Duarte et al. | 715/863 |
| 8,671,384 B2 * | 3/2014 | Hilerio et al. | 717/100 |
| 2001/0028365 A1 * | 10/2001 | Ludolph | 345/764 |
| 2004/0066414 A1 * | 4/2004 | Czerwinski et al. | 345/781 |

(Continued)

FOREIGN PATENT DOCUMENTS

WO     2010148306     12/2010

OTHER PUBLICATIONS

Ziegler, Chris, Ixonos shows off windowed UI for Android, Feb. 20, 2011, engadget, retrieved via internet at http://www.engadget.com/2011/02/20/ixonos-shows-off-windowed-ui-for-android/ on Oct. 18, 2013.*

(Continued)

*Primary Examiner* — Eric J Bycer
(74) *Attorney, Agent, or Firm* — McDermott Will & Emery LLP

(57) ABSTRACT

Methods and systems for displaying content on a webpage are disclosed. The method may include receiving an application indication to open a first application on a touch device. The method may further include displaying the first application on the touch device as a panel overlaid on a portion of a viewable area of a webpage that is currently displayed on the touch device, and displaying a first icon on the touch device relative to the panel and the webpage, the icon representative of the first application. The content of the webpage may be viewable and accessible on a single display window for ease of convenience when navigating from the first application to the second application.

20 Claims, 3 Drawing Sheets

(56) References Cited

U.S. PATENT DOCUMENTS

| | | | |
|---|---|---|---|
| 2004/0125149 A1* | 7/2004 | Lapidous | 345/808 |
| 2004/0261038 A1* | 12/2004 | Ording et al. | 715/792 |
| 2005/0050462 A1* | 3/2005 | Whittle et al. | 715/517 |
| 2005/0060655 A1 | 3/2005 | Gray | |
| 2006/0075348 A1* | 4/2006 | Xu et al. | 715/730 |
| 2006/0200779 A1* | 9/2006 | Taylor | G06F 3/0481 715/781 |
| 2006/0218501 A1* | 9/2006 | Wilson et al. | 715/769 |
| 2007/0006206 A1* | 1/2007 | Dhanjal et al. | 717/168 |
| 2007/0044035 A1* | 2/2007 | Amadio et al. | 715/781 |
| 2007/0136337 A1* | 6/2007 | Sah | G06F 17/3089 |
| 2007/0143704 A1* | 6/2007 | Laird-McConnell | G06F 9/4443 715/781 |
| 2008/0016461 A1* | 1/2008 | Hoblit | 715/788 |
| 2008/0168367 A1* | 7/2008 | Chaudhri et al. | 715/764 |
| 2008/0184159 A1 | 7/2008 | Selig | |
| 2008/0307364 A1* | 12/2008 | Chaudhri et al. | 715/836 |
| 2009/0031247 A1* | 1/2009 | Walter et al. | 715/788 |
| 2009/0049385 A1 | 2/2009 | Blinnikka | |
| 2009/0094562 A1* | 4/2009 | Jeong et al. | 715/863 |
| 2009/0125833 A1* | 5/2009 | Abernethy, Jr. | G06F 9/4443 715/779 |
| 2009/0193364 A1* | 7/2009 | Jarrett et al. | 715/838 |
| 2009/0199127 A1 | 8/2009 | Sareen | |
| 2011/0047459 A1* | 2/2011 | Van Der Westhuizen | 715/702 |
| 2011/0078624 A1* | 3/2011 | Missig et al. | 715/802 |
| 2011/0112665 A1 | 5/2011 | Roberts et al. | |
| 2011/0119601 A1* | 5/2011 | Knothe | G06F 8/38 715/760 |
| 2011/0138314 A1 | 6/2011 | Mir et al. | |
| 2011/0145275 A1* | 6/2011 | Stewart | 707/769 |
| 2011/0148917 A1 | 6/2011 | Alberth, Jr. et al. | |
| 2011/0161308 A1* | 6/2011 | Andersen | G06F 17/30867 707/707 |
| 2011/0209102 A1* | 8/2011 | Hinckley et al. | 715/863 |
| 2011/0252380 A1* | 10/2011 | Chaudhri | 715/836 |
| 2011/0252381 A1 | 10/2011 | Chaudhri | |
| 2012/0030567 A1* | 2/2012 | Victor | 715/702 |
| 2012/0092277 A1* | 4/2012 | Momchilov | 345/173 |
| 2012/0102433 A1 | 4/2012 | Falkenburg | |
| 2012/0159382 A1* | 6/2012 | Matthews et al. | 715/788 |

OTHER PUBLICATIONS

Ixonos showcasing extensive MeeGo & Android expertise at MWC11, Feb. 18, 2011, IxonosOnline via YouTube, retrieved via internet at http://www.youtube.com/watch?feature=player_embedded&v=7E1ckOoeRJg on Oct. 18, 2013.*

Stern, Joanna, HP TouchSmart tm2t review, Jun. 27, 2010, engadget, retrieved via internet at http://www.engadget.com/2010/06/27/hp-touchsmart-tm2-review/ on Oct. 18, 2013.*

Apple at Ease 2.0, Jun. 14, 2004 retrieved from the Internet at http://web.archive.org/web/20040614140953/http://toastytech.com/guis/atease.html on Feb. 4, 2014.*

The Search Report and Written Opinion from the NL Patent Office, dated on Jun. 28, 2012, in related Dutch Patent Application No. 2007903.

Ziegler C, "Ixonos shows off windowed UI for Android," http://www.engadget.com/2011/02/20/ixonos-shows-off-windowed-ui-for-android/, posted Feb. 20, 2011.

Office Actions or Interview summaries mailed on Feb. 10, 2012, Jun. 18, 2012 and Jul. 2, 2012, in related U.S. Appl. No. 13/245,658.

Non-final Office Action dated Dec. 7, 2011, in related U.S. Appl. No. 13/245,658, filed Sep. 26, 2011.

Final Office Action dated Mar. 22, 2012, in related U.S. Appl. No. 13/245,658, filed Sep. 26, 2011.

"Get an Opera-Style Panels Sidebar in Firefox," <http://howtogeek.com/howto/5753/get-an-opera-style-panels-sidebar-in-firefox/>, published on Feb. 18, 2010 as per Wayback Machine.

* cited by examiner

SIMULTANEOUS DISPLAY OF MULTIPLE APPLICATIONS USING PANELS

BACKGROUND

1. Technical Field

The field relates to operating systems, software applications and user interface devices, and, more particularly, to a system, method, apparatus or non-transitory computer program product for displaying a graphical user interface that allows a plurality of windows and/or applications to be viewed and/or manipulated concurrently.

2. Background

Applications are commonly used with computational devices, such as, laptops, smartphones, tablet computing devices, personal digital assistants (PDAs), etc. Applications allow a user to access information sources, webpages, games, and other virtual tools. Applications are usually accessed and viewed one at a time; however, recent trends in computing devices have prompted the user to incorporate multiple applications into a common environment on his or her respective computing device (multitasking).

In one example of operating a computing device, a user may access a webpage from the Internet and download text and/or images to their smartphone. When accessing the web page, the user may select a particular desktop icon, such as a browser icon, and launch a particular application, such as a browser application. Once the user has navigated to his or her favorite source of information or their desired webpage, the user may desire to access other applications concurrently while reading or interfacing with the accessed webpage.

However, the above-noted multitasking operation may become complicated when selecting one application, de-selecting or minimizing that same application, and proceeding to access a second application concurrent with the operation of the first application. Closing an application requires the application to be reopened before it can be resumed. Minimizing, reopening and/or re-executing an application slows the user's ability to re-access that same application at a later time. Furthermore, the limited viewing space on the newer pocket and travel-sized display devices requires increasingly simple and prompt viewing options for the users' satisfaction.

BRIEF SUMMARY

In an embodiment, a method of displaying content on a webpage is disclosed. The method may include receiving an application indication to open a first application on a touch device, displaying the first application on the touch device as a panel overlaid on a portion of a viewable area of a webpage that is currently displayed on the touch device, and displaying a first icon on the touch device relative to the panel and the webpage. The icon is representative of the first application.

In another embodiment, a system may include an on-screen input device configured to receive an application indication to open a first application on a touch device. The system may also include an application manager, implemented with a computing device, configured to display the first application on the touch device as a panel overlaid on a portion of a viewable area of a webpage that is currently displayed on the touch device, and display a first icon on the touch device relative to the panel and the webpage. The icon is representative of the first application.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
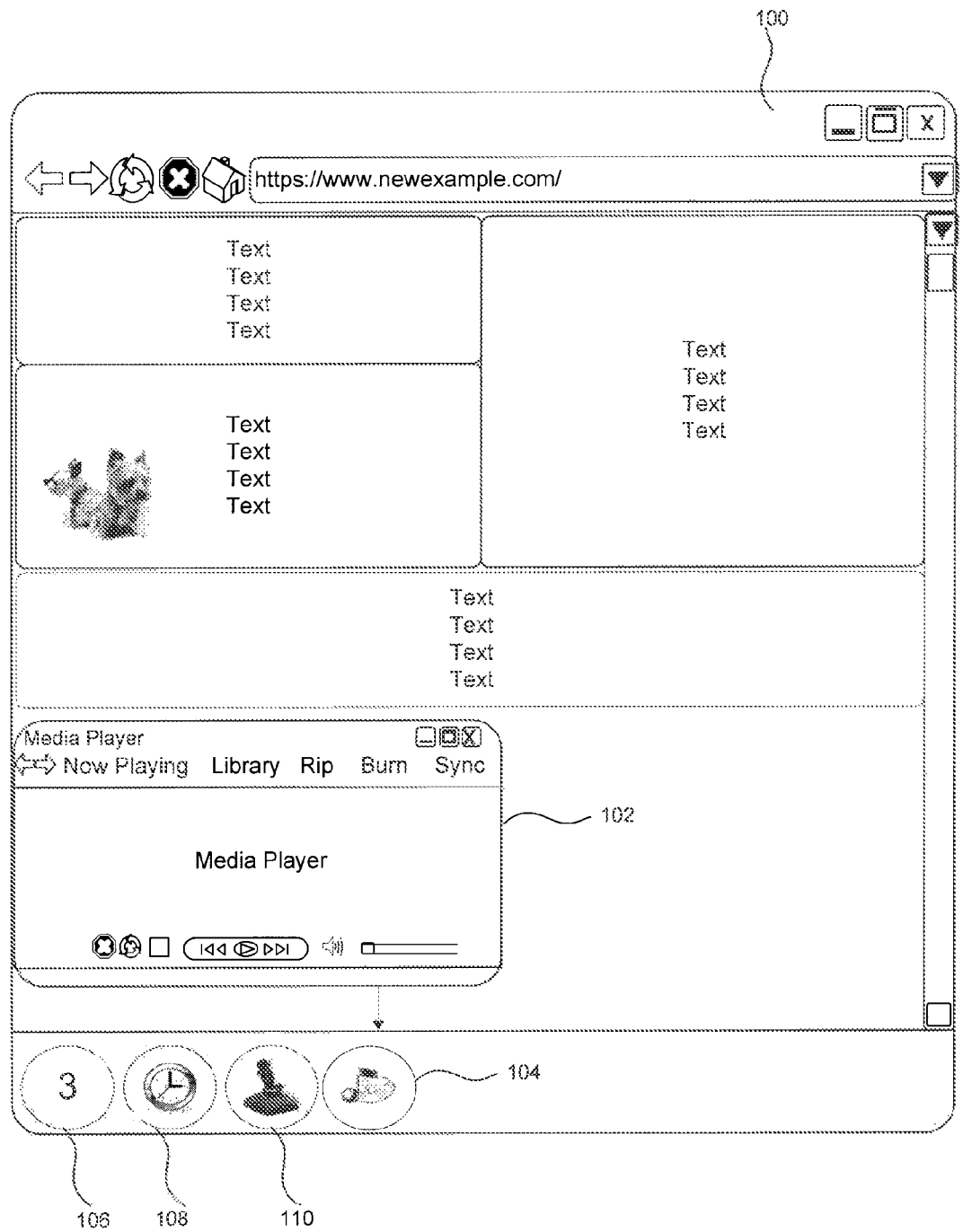
FIG. 1 is an illustration of an example web browser and concurrent application, according to an example embodiment.

Embodiments described herein refer to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Touch screen devices generally provide a touch-sensitive screen that overlays a display monitor or screen. Conventional touch screens often include a layer of capacitive material and may be based on a two-dimensional coordinate grid (X-axis, Y-axis). The areas that are touched create a voltage, which is detected as being at a particular location on the coordinate grid. More advanced touch screen systems may be able to process multiple simultaneous touch signals at different locations on the coordinate grid. Specific examples of touch screen materials may include mutual capacitance, which utilizes two distinct layers of material for sensing touch and driving a voltage or current. Another example is self-capacitance, which uses one layer of individual electrodes connected to capacitance-sensing circuitry. The examples of underlying touch screen technology are for example purposes only and will be omitted from further discussion.

The processor and associated operating system will interpret the received touch input and execute a corresponding application and/or provide a particular result. For example, when a user touches a touch screen surface, the capacitive material sends touch-location data to the processor. The processor uses software stored in the memory to interpret the data as commands and gestures. Input received from the touch screen is sent to the processor as electrical impulses. The processor uses software to analyze the data and determine the characteristics of each touch, such as, the size, shape and location of the touched area on the display touch screen.

Interpretation software may be used to identify the type of gesture. For example, a pinching gesture made with two or more fingers may be used to enlarge or reduce the size of viewable content of a display screen. Pinching may be used to adjust the size (height or width) of content areas. A pinch may be a finger movement that includes moving two fingers in a direction towards one another. Alternatively, one finger may be used to simulate a pinching motion, or more than two fingers may also be used. A pinching motion or movement may be performed by placing, for example, two fingers at two separate locations on the multi-touch display device and dragging them towards each other without moving them off the surface of the multi-touch display device.

FIG. 1 is an illustration of an example web browser and concurrent application, according to an embodiment. A web browser application may be launched via a user selection operation performed on a computing device. The web browser may launch a window used to display a variety of information and content to the user. FIG. 1 illustrates a webpage 100 displaying the present web address. The user may select a web address to view desired content, such as a new website, a consumer website, etc. Once the website has been selected and downloaded to the user's computer, the web browser window may become populated with the downloaded data. The content of the website may include a plurality of formatted spaces or "frames." The frames may appear as predefined areas of the browser window that are populated with content, such as, text, images, flash, video, plug-ins, etc.

Referring again to FIG. 1, once the user has accessed the webpage 100 and the content has loaded, the user will naturally begin browsing the content by reading, viewing, listening, and clicking on items of interest via a touch pad or mouse periphery device. The user may scroll down the webpage to navigate the loaded frames that are below the present viewable space of the corresponding display device. The user may then desire to initiate a multitasking session by launching a different application, such as a media player, mail application, chat application, information source application, schedule application, game application, etc. By launching the additional application the user may desire to continue reading information, such as, news from a news webpage that has loaded, while chatting via a chat application that has been recently launched. Or, the user may desire to begin playing music via a media player application during the course of browsing the content of the webpage 100.

FIG. 1 illustrates a media player 102, illustrated as being below a group of content frames which loaded during the loading of the webpage. The media player 102 includes media access options, such as, play, stop, volume control, etc. The user may begin playing a song stored in the media player directory after the media player 102 has loaded the content area of the webpage 100. The media player 102 is displayed as being overlaid on the webpage 100. The webpage may incorporate the media player 102 by creating a frame customized to fit a portion of the webpage 100.

As a result of the media player application 102 being loaded on the content area of the webpage 100, a corresponding icon may be generated and displayed for user convenience. FIG. 1 illustrates a group of icons which correspond to various applications, such as, a counter "3" 106, a clock 108, a joystick 110, and a musical note/compact disc 104. The counter "3" 106 may be an active counter that displays a number of messages waiting for user acceptance and/or which have yet to be read or acknowledged by the user. The clock 108 may be indicative of an upcoming or soon to be announced calendar entry. The game controller 110 may be a game the user is currently playing, such as, online chess or checkers. The media icon 104 is related to the media player 102 and may be displayed as part of the user's display concurrent with the launching of the media player 102.

The additional application (media player) may be incorporated into the webpage as a customized frame. The frame may be customized according to a default sizing option, or, may be sized according to a user preference. The location of the media player 102 with respect to the other frames of content data on the webpage may default to a middle portion of the viewable content area below a certain number of frames. The location placement of the media player 102 may be linked to a frame indicator that is transmitted from the operating system of the computing device to the browser application. The content of the media player 102 may be rotated to fit the viewable area of the webpage 100. Creating a frame for the media player 102 and/or rotating other frames may be necessary to maintain an aesthetically pleasing display window for the user.

The frame indicator may be transmitted with the launching of the media player application 102. The icon 104 may include an icon indication or image that is used to notify the user that a particular icon is associated with a particular application. The icon indication may be a separate indicator (image) that is loaded into the display area of the icon 104 when the icon 104 is loaded for displaying purposes. By including the media player application 102 with its corresponding icon 104, the user is provided with the capability to access the media player 102 without compromising access to the webpage 100. Both the webpage 100 and media player 102 may be part of the same window interface, and, in turn, both may be linked to the same window interface. The media application 102 may be displayed as a smaller version of its intended display area, or as a full-sized version of its intended display area. Display preferences may be selected by the user before or after the application is loaded as part of the webpage 100.

In some cases, the media player 102 may be the main application with the webpage 100 overlaid on top. The media player 102 may incorporate the webpage 100 by creating a frame customized to fit a portion of the media player 102. In other cases, any application can be the application on which other applications are overlaid on top. A user can select the application on which to overlay other application. For example, a user can identify a messaging application to be the application on which to overlay other applications, such as a webpage.

Figure 2:
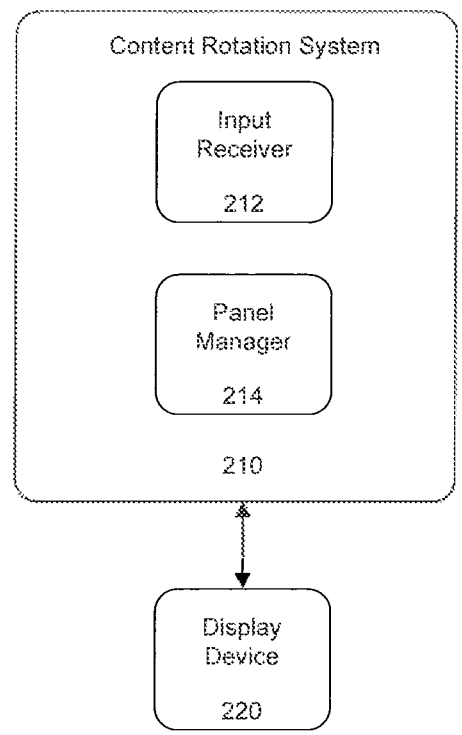
FIG. 2 is an illustration of a content rotation system, according to an example embodiment.

FIG. 2 is a block diagram of an exemplary content rotation system 210 configured to perform a content rotation operation, according to an embodiment. Content rotation system 210, or any combination of its components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

System 210 may include an input receiver 212 and a panel manager 214. The system 210 is in communication with a display device 220, which may be used to display any of the example display configurations discussed in detail above. The input receiver 212 may receive a command to launch a media player application 102. The input may include application information, frame information (frame indicator) and/or other predefined displaying information. The panel manager 214 may use the command and application information to rotate frames of the webpage 100 to accommodate the application being incorporated into the webpage's display area. System 210 may perform the operations in the embodiments described above using FIG. 1. Examples of the embodiments for exemplary system 210 or subsystem components, such as, input receiver 212 and panel manager 214, and methods or any parts or function(s) thereof may be implemented using hardware, software modules, firmware, tangible computer readable or computer usable storage media having instructions stored thereon, or a combination thereof and may be implemented in one or more computer systems or other processing systems.

Figure 3:
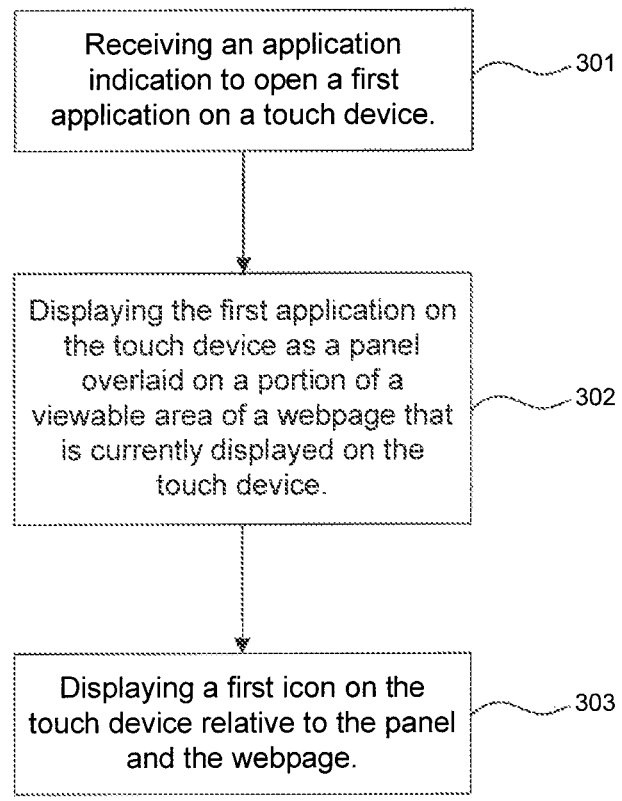
FIG. 3 is an illustration of a flow diagram of an example method of operation, according to an example embodiment.

FIG. 3 is an illustration of a flow diagram of an example method of operation, according to an example embodiment. Referring to FIG. 3, the method may include receiving an application indication to open a first application on a touch device, at step 301. The method may also include displaying the first application on the touch device as a panel overlaid on a portion of a viewable area of a webpage that is currently displayed on the touch device at step 302. Displaying a first icon on the touch device relative to the panel and the webpage, the icon representative of the first application, is shown at step 303.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method, comprising:

receiving an application indication to open a first application on a touch device while the touch device is displaying a webpage within a first display area on the touch device through a second application on the touch device, wherein the second application comprises a web browser, wherein the webpage is displayed within an entirety of the first display area and wherein the first application and second application are each a separate application that can be opened and provide functionality independent of one another, the application indication being received by an operating system independent of the web browser;

opening, by the operating system independent of and external to the web browser, the first application;

providing, by the operating system to the web browser and independent of the first application, location placement information for the first application;

generate, locally by the web browser, a customized frame for the first application when the location placement information is received from the operating system;

displaying the first application on the touch device as a panel displayed in a portion of the first display area of the web browser that is currently displaying the webpage, the first application being displayed in the web browser after having been opened by the operating system independent of and external to the web browser, wherein the webpage includes a plurality of content frames downloaded from a website, and the locally generated customized frame containing the first application is incorporated into the webpage at a location determined from the location placement information and non-overlapping with any of the plurality of content frames; and displaying a first icon on the touch device relative to the panel and the webpage, the first icon being representative of the first application.

2. The method of claim 1, further comprising:
displaying the webpage on the touch device together with the first application and its respective first icon on a same window.

3. The method of claim 1, further comprising:
displaying an icon indication relative to the first icon indicating that first application that is displayed on the touch device, the icon indication being indicative of a function of the first application.

4. The method of claim 1, wherein displaying the first application further comprises:
displaying a full size version of the first application on the touch device as the panel overlaid on the portion of a viewable area of the webpage that is currently displayed.

5. The method of claim 1, further comprising:
displaying multiple icons on the touch device, wherein each icon is representative of a respective application available on the touch device.

6. The method of claim 5, further comprising:
receiving an indication of one icon of the multiple icons; and
displaying a third application associated with the one icon on the touch device overlaid on top of the webpage, the third application being displayed instead of the first application.

7. A system, comprising:
an on-screen input device configured to:
receive an application indication to open a first application on a touch device while the touch device is displaying a webpage within a first display area on the touch device through a second application on the touch device, wherein the second application comprises a web browser application, wherein the webpage is displayed within an entirety of the first display area and wherein the first application and second application are each a separate application running on an operating system that can be opened and provide functionality independent of one another; and provide location placement information for the first application to an application manager, and independent of the first application, when the first application is opened; and the application manager, implemented with a computing device, configured to:

generate, locally, a customized frame for the first application when the location placement information is received from the on-screen input device, display the first application on the touch device as a panel displayed in a portion of the first display area of the web browser application that is currently displaying the webpage, wherein the webpage includes a plurality of content frames downloaded from a website, and the locally generated customized frame including the first application is incorporated into the webpage at a location determined from the location placement information and non-overlapping with any of the plurality of content frames; and display a first icon on the touch device relative to the panel and the webpage, the first icon being representative of the first application.

8. The system of claim 7, wherein the application manager is further configured to:

display the webpage on the touch device together with the first application and its respective first icon on a same window.

9. The system of claim 7, wherein the application manager is further configured to:

display an icon indication relative to the first icon indicating the first application that is displayed on the touch device, the icon indication being indicative of a function of the first application.

10. The system of claim 7, wherein the application manager is further configured to:

display a full size version of the first application on the touch device as the panel overlaid on the portion of a viewable area of the webpage that is currently displayed.

11. The system of claim 7, wherein the application manager is further configured to:

display multiple icons on the touch device, wherein each icon is representative of a respective application available on the touch device.

12. The system of claim 11, wherein the application manager is further configured to:

receive an indication of one icon of the multiple icons; and display a third application associated with the one icon on the touch device overlaid on top of the webpage, the third application being displayed instead of the first application.

13. The system of claim 7, wherein the on-screen input device is further configured to receive the application indication independent of the web browser application, and the first application is opened by the operating system independent of and external to the web browser application.

14. The system of claim 13, wherein the first application is displayed in the web browser application after having been opened by the operating system independent of and external to the web browser application.

15. The system of claim 7, wherein the plurality of content frames are reorganized within the webpage to accommodate incorporating the customized frame within the webpage at the location determined from the location placement information.

16. A computer program product comprising instructions stored in a non-transitory computer-readable storage medium, the instructions comprising:

instructions to provide a first application;

instructions to receive location placement information from an operating system and independent of the first application, the location placement information corresponding to a second application opened by the operating system external to, and independent of, the first application;

instructions to generate locally, by the first application, a customized frame for displaying the second application within a window of the first application when the location placement information is received from the operating system; and instructions to display, by the first application, the customized frame containing the second application within the window of the first application after the second application having been opened by the operating system external to, and independent of, the first application, wherein the customized frame is displayed within the window at a location determined based at least in part on the location placement information and non-overlapping with any other content frames within the window of the first application.

17. The computer program product of claim 16, the instructions further comprising:

instructions to display, by the first application, at least one other frame within the window, the at least one other frame having been downloaded over a network.

18. The computer program product of claim 17, wherein the first application comprises a web browser application, and the at least one other frame is downloaded from a web site over the network.

19. The computer program product of claim 18, the instructions further comprising:

instructions to relocate and resize, by the first application, the at least one other frame within the window to accommodate the display of the customized frame within the window at the location determined based at least in part on the location placement information.

20. The computer program product of claim 16, the instructions further comprising:

instructions to display, by the first application, a first icon that is representative of the second application.

* * * * *